No. 607,492. Patented July 19, 1898.
H. L. THOMAS & W. C. NUSSER.
STOP COCK REPLACER.
(Application filed Dec. 27, 1897.)
(No Model.)
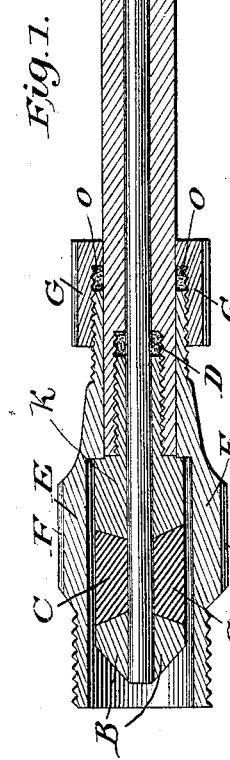
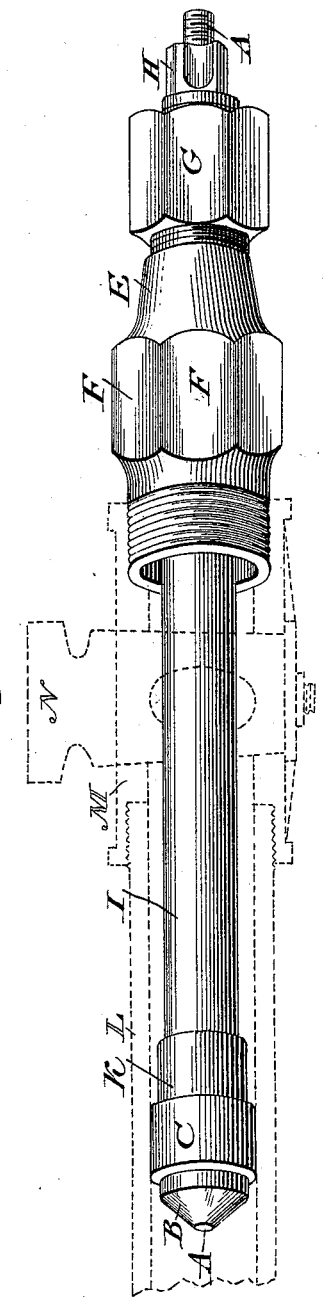
Witnesses:
9 E Ward.
H. J. Ward.
Inventors:
Harry L. Thomas
William C. Nusser.

UNITED STATES PATENT OFFICE.

HARRY L. THOMAS AND WILLIAM C. NUSSER, OF FINDLAY, OHIO, ASSIGNORS OF ONE-THIRD TO EDSON E. MARVIN, OF SAME PLACE.

STOP-COCK REPLACER.

SPECIFICATION forming part of Letters Patent No. 607,492, dated July 19, 1898.

Application filed December 27, 1897. Serial No. 663,555. (No model.)

*To all whom it may concern:*

Be it known that we, HARRY L. THOMAS and WILLIAM C. NUSSER, citizens of the United States, residing at Findlay, in the county of Hancock and State of Ohio, have invented a new and useful machine for removing and replacing stop-cocks, gates, or other valves of sufficient way upon pipes either under pressure or otherwise without the loss of contents of said pipes, of which the following is a specification.

Our invention relates to the removing and replacing of stop-cocks, gates, or other valves of sufficient way upon pipes filled or containing liquids, gases, or other fluids, either under pressure or otherwise, without emptying the same of their contents and without the loss of the contents of said pipe or pipes in removing one stop-cock, gate, or other valve of sufficient way and replacing same or another stop-cock, gate, or other valve of sufficient way upon said pipe; and the object of our invention is, first, to avoid the necessity of tearing up paved or improved streets to shut off the supply of liquid, fluids, or gases to any pipe in order to repair stop-cock, gate, or other valve of sufficient way located inside the curb of street or elsewhere; secondly, to avoid the necessity of shutting off a street-main or section of same while repairing or replacing stop-cock, gate, or other valve of sufficient way to prevent the loss of contents of said pipe either if under pressure or otherwise; thirdly, to avoid the necessity of turning off any other cock or valve in order to repair or replace any stop-cock, gate, or other valve of sufficient way upon any pipe. We attain these objects by the mechanism in the accompanying drawings, in which—

Figure 1 is a vertical section of the entire machine. Fig. 2 is a view of the machine as it appears attached to valve to be removed from pipe, dotted or broken lines denoting parts foreign to the invention. Fig. 3 shows barrel of machine and valve removed, with plunger still in place to prevent the escape of the contents of pipe.

Similar letters refer to similar parts throughout the several views.

The barrel E E and nut G G, united by means of threads, form the body of the machine, which is constructed to encircle the plunger A B C K I H and form a stuffing-box at O O, which may be tightened by means of nut G G to hold plunger in position while adjusting the nut H H to expand or release tube C C and at same time to prevent the escape of the contents of the pipe L L around the plunger A B C K I while valve is open for entrance of said plunger into pipe beyond, the barrel E E being also formed to receive the head of the plunger A B C K and by means of an offset to engage with a shoulder on plunger-tube K K to prevent the plunger A B C K I H from pushing through rearward.

The plunger is constructed to operate through the body, as above described, and to enter through stop-cock, gate, or other valve of sufficient way into pipe L L beyond, in which the expansion-tube C is enlarged to come firmly into contact with the inner circumference of the pipe, and this is accomplished by tightening nut H, which pulls upon plunger-rod A, and this upon head of plunger B, and this in turn upon expansion-tube C, while at same time nut H pushes upon plunger-tubes I and K and the latter against the expansion-tube C, causing the same to be compressed at the ends and enlarged in circumference, entirely filling the pipe L L, remaining thus until released by nut H and preventing escape of contents of pipe L L while removing and replacing the body, as above described, and the stop-cock, as shown M M M M N in Fig. 2, gate, or other valve of sufficient way. The plunger-rod A is securely fastened to plunger-head B and is encircled by expansion-tube C, plunger-tube K, stuffing-box D D, and plunger-tube I, through all of which it works by means of nut H. The plunger-tube K and I is purposely constructed of two pieces, engaging with each other by means of threads to afford a stuffing-box D D around plunger-rod A to prevent the escape of the contents of pipe L L along said rod. The nut H is threaded to work upon plunger-rod A, which is correspondingly threaded to receive same, said nut H being also formed with shoulder, affording a side bearing on a corresponding offset in plunger-tube I, thus giving a straight pull upon plunger-rod A and even bearing on end of plunger-tube I, against which nut H pushes in tightening.

What we do claim as our invention is—

The combination of a barrel E E stuffing-box O O with adjusting-nut G G and plunger-rod with expansion-tube containing a stuffing-box D D whereby a stop-cock, gate or other valve of sufficient way may be removed and another replaced upon any pipe without the loss of the contents of the said pipe whether the same be under pressure or not which is accomplished substantially as set forth in this specification.

HARRY L. THOMAS.
WILLIAM C. NUSSER.

Witnesses:
MERLE D. SOURS,
D. A. ROBERTS.